("12") United States Patent  
Jendrichowski (10) Patent No.: US 8,694,151 B2  
(45) Date of Patent: Apr. 8, 2014

(54) APPARATUS FOR THE REMOVAL OF BOTTLES OR CONTAINERS FROM A BOTTLE OR CONTAINER CLEANING ARRANGEMENT IN A BOTTLE OR CONTAINER FILLING PLANT

(75) Inventor: Klaus Jendrichowski, Holzwickede (DE)

(73) Assignee: KHS GmbH, Dortmund (DE)

( * ) Notice: Subject to any disclaimer, the term of this patent is extended or adjusted under 35 U.S.C. 154(b) by 406 days.

(21) Appl. No.: 12/501,228

(22) Filed: Jul. 10, 2009

(65) Prior Publication Data

US 2010/0174394 A1     Jul. 8, 2010

Related U.S. Application Data

(63) Continuation-in-part of application No. PCT/EP2007/011236, filed on Dec. 20, 2007.

(30) Foreign Application Priority Data

Jan. 13, 2007   (DE) .......................... 10 2007 002 011

(51) Int. Cl.  
    *G06F 19/00*      (2011.01)
(52) U.S. Cl.  
    USPC ................... 700/213; 198/395; 250/223 B
(58) Field of Classification Search  
    USPC ........................................................ 700/213  
    See application file for complete search history.

(56) References Cited

U.S. PATENT DOCUMENTS

| | | | | |
|---|---|---|---|---|
| 2,677,471 A | | 5/1954 | Skinner | |
| 3,433,966 A | * | 3/1969 | Letch et al. | ............... 250/223 B |
| 3,506,840 A | * | 4/1970 | Fink | .......................... 250/223 B |
| 3,710,922 A | * | 1/1973 | Lanphere et al. | ............. 198/395 |
| 3,826,381 A | * | 7/1974 | Kulig et al. | ................... 198/428 |
| 4,530,430 A | * | 7/1985 | Peterlini | ........................ 198/395 |
| 4,767,142 A | | 8/1988 | Takahashi et al. | |
| 4,819,784 A | * | 4/1989 | Sticht | ............................ 198/395 |
| 4,822,236 A | | 4/1989 | Inoue et al. | |
| 5,135,276 A | | 8/1992 | Blatt et al. | |
| 5,219,432 A | | 6/1993 | Delbe et al. | |
| 5,370,216 A | * | 12/1994 | Tsuruyama et al. | .......... 198/395 |
| 5,419,350 A | * | 5/1995 | Wegner | .......................... 134/79 |
| 5,467,790 A | | 11/1995 | Heckler | |
| 5,924,546 A | * | 7/1999 | Funaya | ......................... 198/395 |

(Continued)

FOREIGN PATENT DOCUMENTS

| | | |
|---|---|---|
| DE | 21 26 198 | 12/1972 |
| DE | 296 04 683 | 5/1996 |

(Continued)

OTHER PUBLICATIONS

English translation of Chinese Office Action 200780049797.2.

(Continued)

*Primary Examiner* — Gene Crawford  
*Assistant Examiner* — Kyle Logan  
(74) *Attorney, Agent, or Firm* — Nils H. Ljungman & Associates (57) ABSTRACT

A removal apparatus for the removal of containers from a stream of containers moved in groups or lanes of a container treatment plant. The removal apparatus utilizes a suction cup of a handling element to remove containers in an undesired orientation out of a stream of containers.

20 Claims, 5 Drawing Sheets

(56) References Cited

U.S. PATENT DOCUMENTS

| | | | |
|---|---|---|---|
| 6,365,906 B1 * | 4/2002 | Spangenberg et al. | 250/559.3 |
| 6,502,877 B2 * | 1/2003 | Schick et al. | 294/65 |
| 6,961,638 B2 * | 11/2005 | Ouellette | 700/213 |
| 2003/0105550 A1 * | 6/2003 | Ouellette | 700/213 |
| 2004/0011623 A1 | 1/2004 | Sala | |
| 2006/0182610 A1 * | 8/2006 | Sala et al. | 414/757 |

FOREIGN PATENT DOCUMENTS

| | | |
|---|---|---|
| DE | 195 49 454 | 8/1997 |
| DE | 199 28 734 | 12/2000 |
| DE | 200 06 059 | 12/2000 |
| DE | 100 07 627 | 9/2001 |
| DE | 103 38 061 | 3/2005 |
| DE | 10 2005 014 3 | 9/2006 |
| EP | 0 017 489 | 10/1980 |
| EP | 0 596 189 | 5/1994 |
| EP | 0 930 136 | 7/1999 |
| EP | 1 700 643 | 9/2006 |
| FR | 20 30 980 | 11/1970 |
| GB | 2 193 479 | 2/1988 |
| JP | H03245885 A | 11/1991 |
| JP | H07267360 A | 10/1995 |
| JP | 2000-072232 A | 3/2000 |
| JP | 2001-002232 A | 1/2001 |
| JP | 2001301960 | 10/2001 |
| WO | WO 90/12675 | 11/1990 |

OTHER PUBLICATIONS

International Search Report PCT/EP2007/011236 and English translation thereof.

International Preliminary Report on Patentability PCT/EP2007/011236 and English translation thereof.

English translation of the brief description of the figures and nomenclature for JPH04122527U.

English translation of the brief description of the figures and nomenclature for JPH0356724U.

English translation of the brief description of the figures and nomenclature for JPH0334889U.

* cited by examiner

APPARATUS FOR THE REMOVAL OF BOTTLES OR CONTAINERS FROM A BOTTLE OR CONTAINER CLEANING ARRANGEMENT IN A BOTTLE OR CONTAINER FILLING PLANT

CONTINUING APPLICATION DATA

This application is a Continuation-In-Part application of International Patent Application No. PCT/EP2007/011236, filed on Dec. 20, 2007, which claims priority from Federal Republic of Germany Patent Application No. 10 2007 002 011.4, filed on Jan. 13, 2007. International Patent Application No. PCT/EP2007/011236 was pending as of the filing date of this application. The United States was an elected state in International Patent Application No. PCT/EP2007/011236.

BACKGROUND

1. Technical Field

The present application relates to an apparatus for the removal of bottles or containers from a bottle or container cleaning arrangement in a bottle or container filling plant. The present application further relates to an apparatus for the removal of containers from a container treatment plant.

2. Background Information

Background information is for informational purposes only and does not necessarily admit that subsequently mentioned information and publications are prior art.

In large beverage bottling plants, for example, it sometimes happens that individual containers must be removed or may be removed from the plant while the equipment is still in operation. Such an event can occur, for example, if a container becomes jammed or tips over and can then no longer be transported or processed. One potential application is container cleaning plants such as bottle rinsing plants, for example. In these plants, the bottles to be rinsed are delivered via a plurality of conveyor lines and are then divided among a plurality of parallel or substantially parallel inlet guides of the rinsing plant. In the vicinity of these inlet guides, in which the containers from the transport lines are fanned out on the guides, the bottles, which are standing upright, bump into one another and are not always or substantially always distributed uniformly, as a result of which individual bottles can fall over. In that case, they lie in front of the guides, where they can disrupt operations. Because such plants are generally very wide, the fallen containers are directly accessible without shutting down the plant from the outside, in the peripheral area. Slowing down the plant to remove the disruption can lead to failures of the overall plant and thus to lost production and increased costs.

In some systems for the removal and outward transfer of bottles, the bottles which are transported in an upright position in rows or lanes, as well as defective bottles, are picked up by a detection device and transferred outward by means of a transfer channel and a pusher from the stream of containers. Some devices are suitable for the detection and removal of bottles that have fallen over in such a lane. In some detection systems, a stationary pusher and a transfer channel work together to eject the fallen bottle laterally from the transport lane.

These systems, which are effective and have been operational for some time, have the disadvantage that they may only be used for the removal of bottles from individual lanes, because space for the removal must or should be provided immediately or substantially immediately next to the lane.

OBJECT OR OBJECTS

An object of the present application is to make available an apparatus for the removal of containers from a container treatment plant which makes it possible to quickly and reliably remove individual containers from the plant while the plant remains in operation. Another object of the present application is to make available an apparatus for the removal of containers from a container treatment plant which makes it possible to quickly and reliably remove individual containers from a group of containers moving forward.

SUMMARY

The present application teaches that this object is accomplished by an apparatus for the removal of containers from a container treatment plant, wherein a handling element is provided with a suction cup which is located on its end and to which a partial vacuum is applied. The handling element is realized so when the partial vacuum is applied, a container is held by the suction cup.

With a handling element of this type, the containers can be picked up and removed from the plant without having to shut down the plant. It is also possible to reach bottles that in large plants are in areas that lie outside the immediate or substantially immediate reach of the operating personnel.

For this purpose, a handling element with a suction cup located on the end is provided to which a partial vacuum can be applied. The container, such as a fallen bottle, for example, can be held by the suction cup and thereby removed.

As a result of the optional application of a partial vacuum, it becomes easily possible to pick up and release the container. The holding force can also be adjusted to the level necessary and/or desired by the optional regulation of the strength of the partial vacuum.

Realizations of the present application are described according to the present application.

In a first realization of the apparatus according to the present application, the handling element is located on a movable slide and is realized so that it can be extended in the longitudinal direction. The slide is located in a guide which covers the pick-up area that must or should be covered, so that the slide together with the handling element can be moved to the positions in which containers must be removed or should be removed. On account of the longitudinal mobility of the handling element, bottles that have fallen down can be picked up and removed upward, and then transported laterally into a discharge area. In at least one possible embodiment, the pick-up area is the inlet area, for example of a container handling machine, and the discharge area can be in a location in which the bottles can be placed without causing any interference with the rest of the plant.

Basically, the slide with the handling element can be moved manually.

In at least one possible embodiment of the present application, the slide with the handling element can be moved automatically.

For this purpose, in one realization of the present application a detection device is provided which can detect when and where a container must or should be removed, such as, for example, when and where a bottle has fallen over. The fallen bottle can be detected visually using sensor strips or camera systems with appropriate image processing systems, and/or by a system of mechanical sensors. A control apparatus is also provided which, after the detection of a container to be removed, moves the slide to the corresponding position, extends the handling element toward the container and picks up the container by activating the partial vacuum. The control apparatus can then retract the handling element and thereby remove the container from the plant from above. When the slide is subsequently moved into the discharge area and the partial vacuum is deactivated, the container is then released and the apparatus is ready for the removal of the next container.

In an alternative realization of the apparatus according to the present application, the handling element is connected with the suction cup which is located on its end by means of a ball and socket joint with a tube which in this embodiment is realized so that it can be moved longitudinally. A gripper element, with a control device if necessary and/or desired, can be located on the tube and can be used to apply a partial vacuum through the tube to the suction cup. This partial vacuum can be produced by a pneumatic connection with a controllable vacuum element.

In this apparatus, containers can also be removed from a container treatment plant by a human operator. By means of the longitudinally movable tube guide, even containers that are at a significant distance from the operator can be picked up. On account of the articulated connection, containers can also be picked up in relatively inaccessible places.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is explained in greater detail below with reference to the possible embodiment illustrated in the accompanying drawings, in which.

DESCRIPTION OF EMBODIMENT OR EMBODIMENTS

Figure 1:
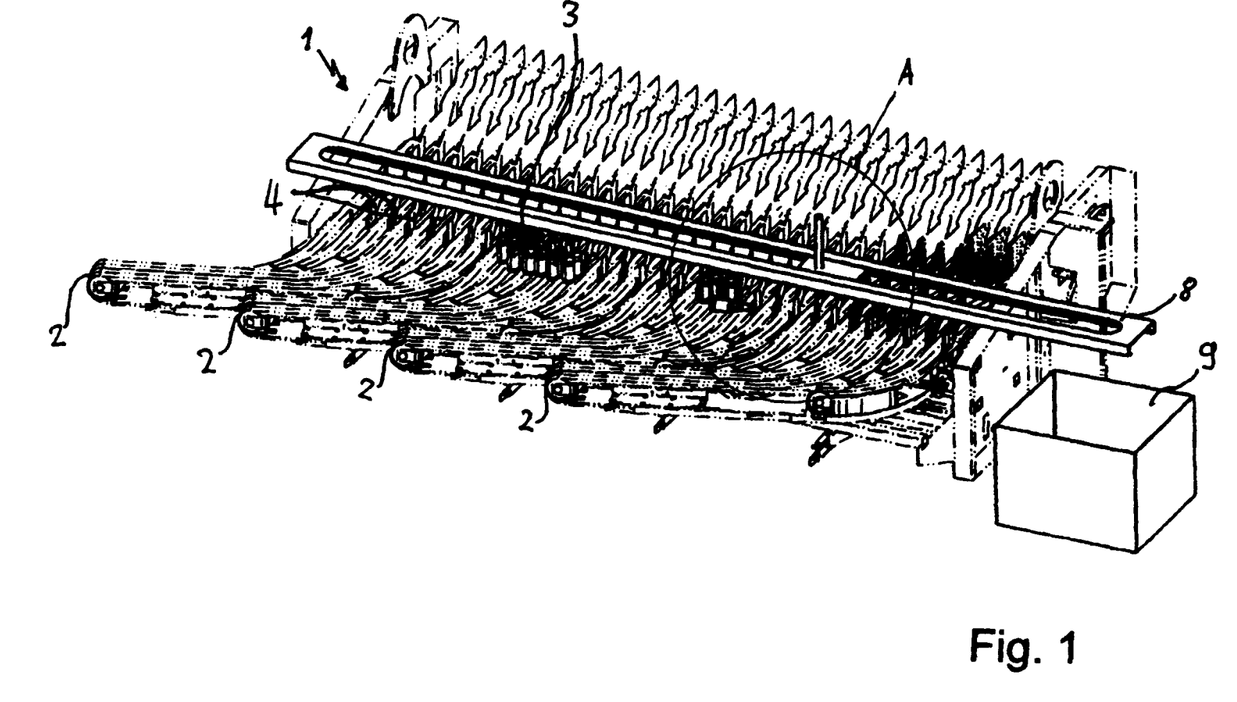
FIG. 1 is a schematic two-dimensional view of a container treatment plant in a first embodiment of the present application.

The inlet area 1 of a container treatment plant, which is not shown in any greater detail, and in this case is a bottle rinsing machine, is illustrated in greater detail in FIG. 1. By means of four conveyor lines 2, containers, in this case bottles 3, are delivered to the machine. The container treatment plant has a plurality of parallel or substantially parallel inlet guides 4, in front of which the bottles 3 are fanned out. For purposes of illustration, Section A is shown on a larger scale in FIG. 2. The plurality of parallel or substantially parallel container guides 4 make it possible to rinse a large number of bottles simultaneously or substantially simultaneously and thereby to achieve a high production rate of the plant.

Figure 2:
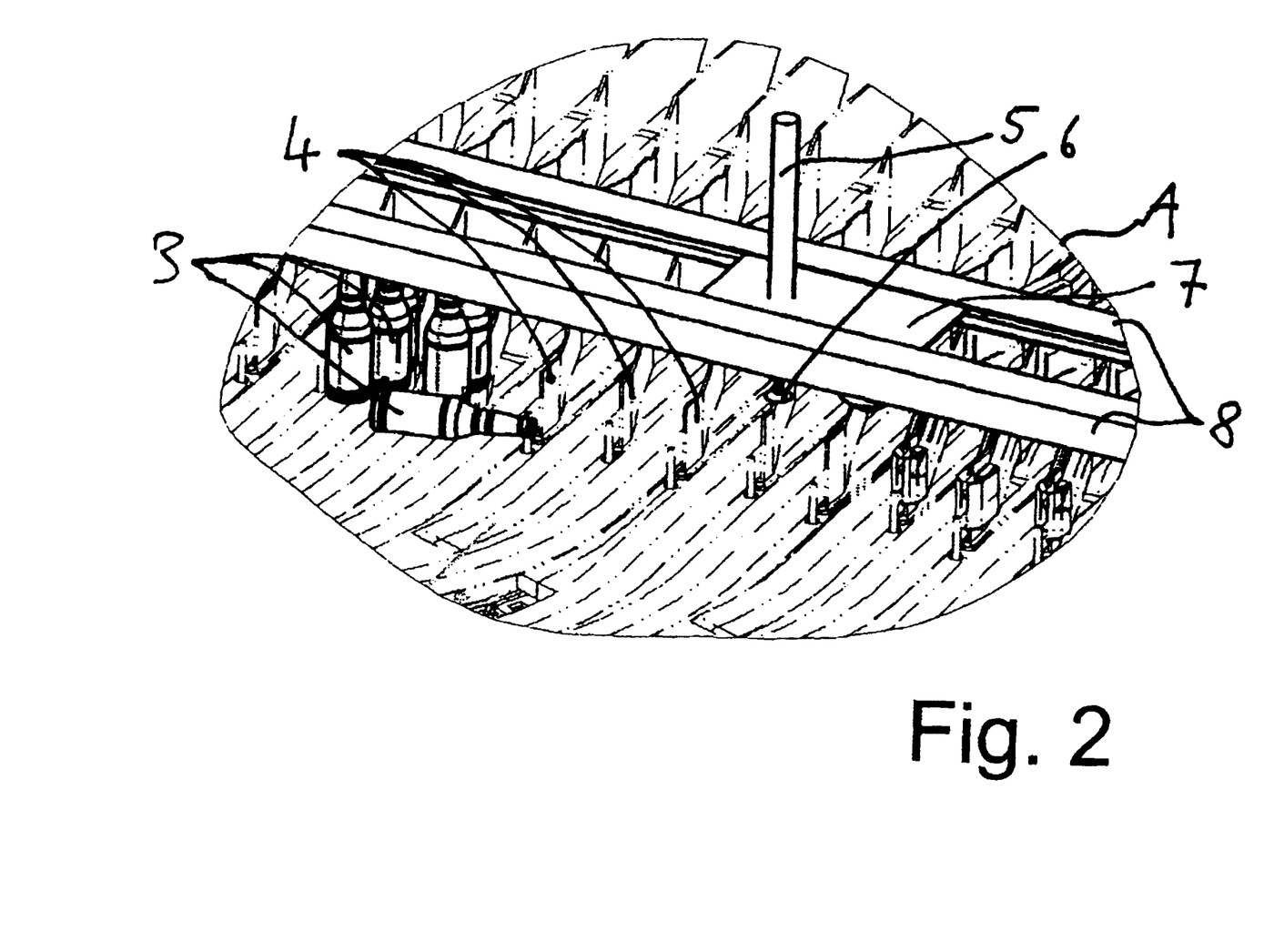
FIG. 2 is an enlarged view of the marked area in FIG. 1.

It sometimes happens that, as illustrated, bottles 3 fall over and partly block the inlet guides 4. In that case at least the throughput of the plant is reduced, because the sections of the plant that are blocked by the fallen bottle can no longer be supplied with bottles 3. It is also altogether possible, however, for the fallen bottles to cause other bottles 3 to fall over or even to become jammed and thereby cause disruptions that can extend all the way up to the shutdown of the plant.

To solve this problem, the present application discloses a handling element 5, on the lower end of which a suction cup 6 is located and to which a partial vacuum can be applied. As a result, a suction effect is created which essentially ensures or promotes that a bottle 3 is held in contact with the suction cup 6 by the partial vacuum applied to the suction cup 6. The handling element 5 is vertically adjustable, so that the suction cup 6 can be moved down and up with a bottle 3 that may be located in it.

The entire handling element 5 is located on a movable slide 7 which can be moved back and forth on a guide rail 8 over the total width of the inlet area 1 of the container handling plant.

The guide rails 8 are also designed so that the sled 7 can be moved over a discharge container 9 which is located laterally next to the plant.

Figure 4:
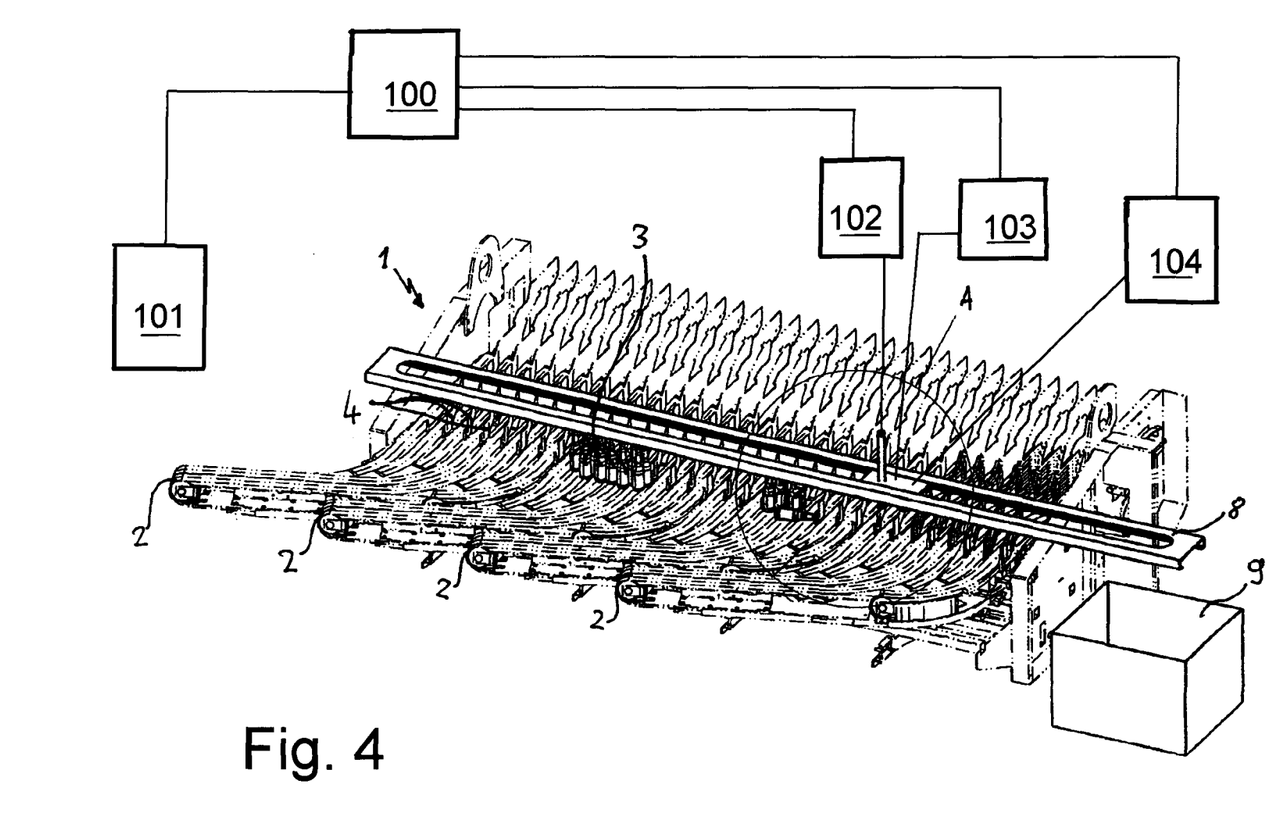
FIG. 4 is another view of the container treatment plant shown in FIG. 1 with a additional features.

As shown in FIG. 4, a detection device 101 is provided for the monitoring of the plant. In one embodiment, this detection device 101 is realized in the form of a camera system which monitors the proper status of the inlet area 1 by means of a downstream image processing system and can detect when a bottle 3 has fallen over and its position in the inlet area 1. It should be understood that types of sensor or image systems other than cameras could be utilized in the detection device 101.

A control apparatus 104 then moves the sled 7 with the handling element 5 over the fallen bottle, whereupon the handling element 5 with its suction cup 6 is lowered, a partial vacuum is applied to the suction cup 6 and then the handling element 5 is raised again, whereby as a result of the partial vacuum applied to the suction cup 6, the fallen bottle is removed upward out of the inlet area 1. Then the slide 7 is moved by the control apparatus 104 over the discharge container 9 and the partial vacuum is deactivated, so that the bottle is released and falls into the discharge container 9. The control apparatus 104 can comprise a drive or motor arrangement that moves the slide 7 back and forth on the guide rails 8. The handling element 5 is operatively connected to a vacuum source 102 which provides the vacuum. In addition, in the embodiment shown in FIG. 4, an image or sensor arrangement 103 is mounted on the slide 7, which image or sensor arrangement 103 may be utilized to further detect the exact position and/or orientation of a fallen bottle. The image or position data gathered by the image or sensor arrangement 103 could be utilized to finely adjust the position of the handling element 5 and the suction cup 6 with respect to the fallen bottle, so as to promote accurate and secure retrieval of the fallen bottle. For example, it may be desirable to contact a fallen bottle with the suction cup 6 on the body or barrel of the bottle, that is, not on the usually smaller neck portion of the bottle. The image or sensor arrangement 103 could permit adjustment of the position of the suction cup 6 such that, upon extension or descent thereof toward the bottle, the suction cup 6 will contact the bottle at the body portion of the bottle, possibly near the middle of the body if desired. Further, for example, the bottle, upon falling, could be subject to a rolling, rotational movement by the conveyor on which the bottle is resting, or could be jostled around by the other bottles around it. Such movements could possibly be a hindrance to a secure grasping and removal of the bottle by the suction cup 6. Again, a fine adjustment of the positioning of the suction cup 6 based on the detected position of the fallen bottle could allow for the suction cup 6 to be aligned or positioned in a position with respect to the bottle predetermined to be an position effective to permit secure grasping and removal of the bottle.

In order to coordinate the image and/or sensor data with the movement and operation of the bottle removal arrangement, the detection device 101, the vacuum source 102, the image or sensor arrangement 103, and the control apparatus 104 are operatively connected to a computer control system 100. The computer control system 100 is appropriately programmed to utilize the data gathered by the detection device 101 and the image or sensor arrangement 103 to activate the control apparatus 104 to move the slider 7 and the handling element 5 adjacent a fallen bottle. Once the computer 100 detects that the handling element 5 and suction cup 6 are appropriately aligned with the fallen bottle, the computer 100 can activate the vacuum source 102 to create a suction force and then activate the handling element 5 to move the suction cup 6 into contact with the fallen bottle. The computer 100 can then retract the handling element 5 once the bottle is securely grasped, and then activate the control apparatus 104 to move the slider 7 and the handling element 5 to the discharge container 9, at which point the computer 100 can shut off the vacuum source 102, thereby allowing the bottle to drop into the discharge container 9.

The system is then ready to pick up another fallen bottle and remove it from the machine.

If bottles 3 fall in locations that are not immediately or substantially immediately in front of the inlet guides 4, they are gradually pushed by the general forward movement of the bottles toward the inlet guides 4, where they can then be removed from the plant in the manner described above.

Figure 3:
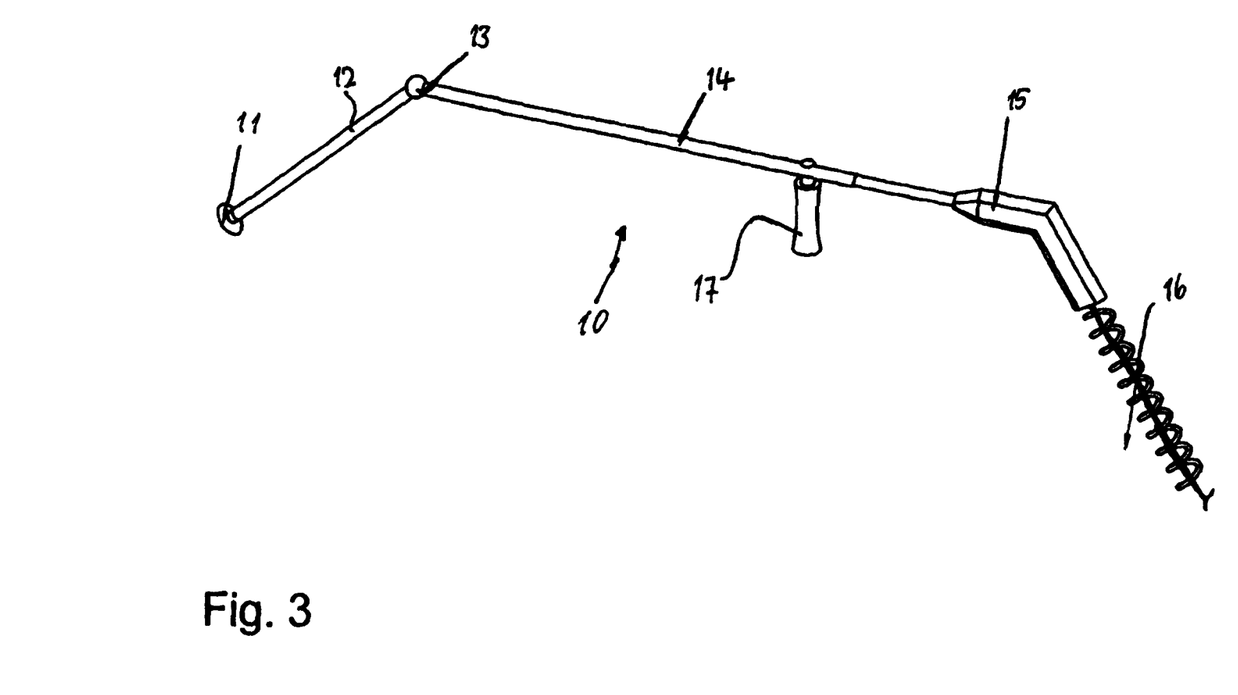
FIG. 3 is a two-dimensional view of the apparatus according to the present application in a second embodiment.

An alternative realization of the present application is illustrated in greater detail in FIG. 3.

In a second realization, the apparatus according to the present application is realized in the form of a manually operated handling element 10. It also has, on one end, a suction cup 11 which is connected by means of tube connection 12 and a ball and socket joint 13 with an additional tube connection 14. The latter tube connection is itself realized so that it can be moved longitudinally. Located on a gripper 15 is a control apparatus which is not illustrated in any further detail, which can apply a partial vacuum to the suction cup 11 by means of the hollow interior of the tube connections 12, 14 and the ball and socket joint 13. For this purpose, a pneumatic connection 16 is present, which is connected to a standard compressed air supply and can be converted via a vacuum element in the interior of the gripper 15 into a partial vacuum. The handing of the apparatus is improved and the longitudinal adjustment of the tube 14 is simplified by means of an additional gripper 17.

With this apparatus, too, it is a simple matter to remove a fallen bottle from a container treatment machine of the type illustrated by way of example in FIG. 1. For this purpose the suction cup 11 is moved by an operator, using the grippers 15 and 17, to the bottle to be removed, and by actuating the control element the partial vacuum is applied to the suction cup 11. The suction cup 11 then picks up the bottle and makes possible its easy removal from the plant. In this manner, containers that are located in relatively inaccessible parts of the plant can be reached by means of the apparatus according to the present application without having to shut down the plant or endangering the operating personnel.

In at least one possible embodiment, the container or bottle rinsing or cleaning machine is used to clean or rinse return bottles or return containers. For example, return bottles often contain residue of the product that was in the bottle as well as other contaminants, such as dirt and bacteria. In addition, return bottles usually have a label of some kind on the outer surface thereof. In order to reuse these bottles or containers, they must be rinsed or cleaned to remove both the contaminants as well as any label material, which rinsing or cleaning may be performed by the rinsing or cleaning machine. After the bottles have been thoroughly cleaned, they can be reused in a bottle or container filling plant. An example of such a container or bottle rinsing or cleaning machine may be found in U.S. Pat. No. 7,392,632, issued on Jul. 1, 2008, to inventors Wiedemann and Jendrichowski, which patent is hereby incorporated by reference as if set forth in its entirety herein.

Figure 5:
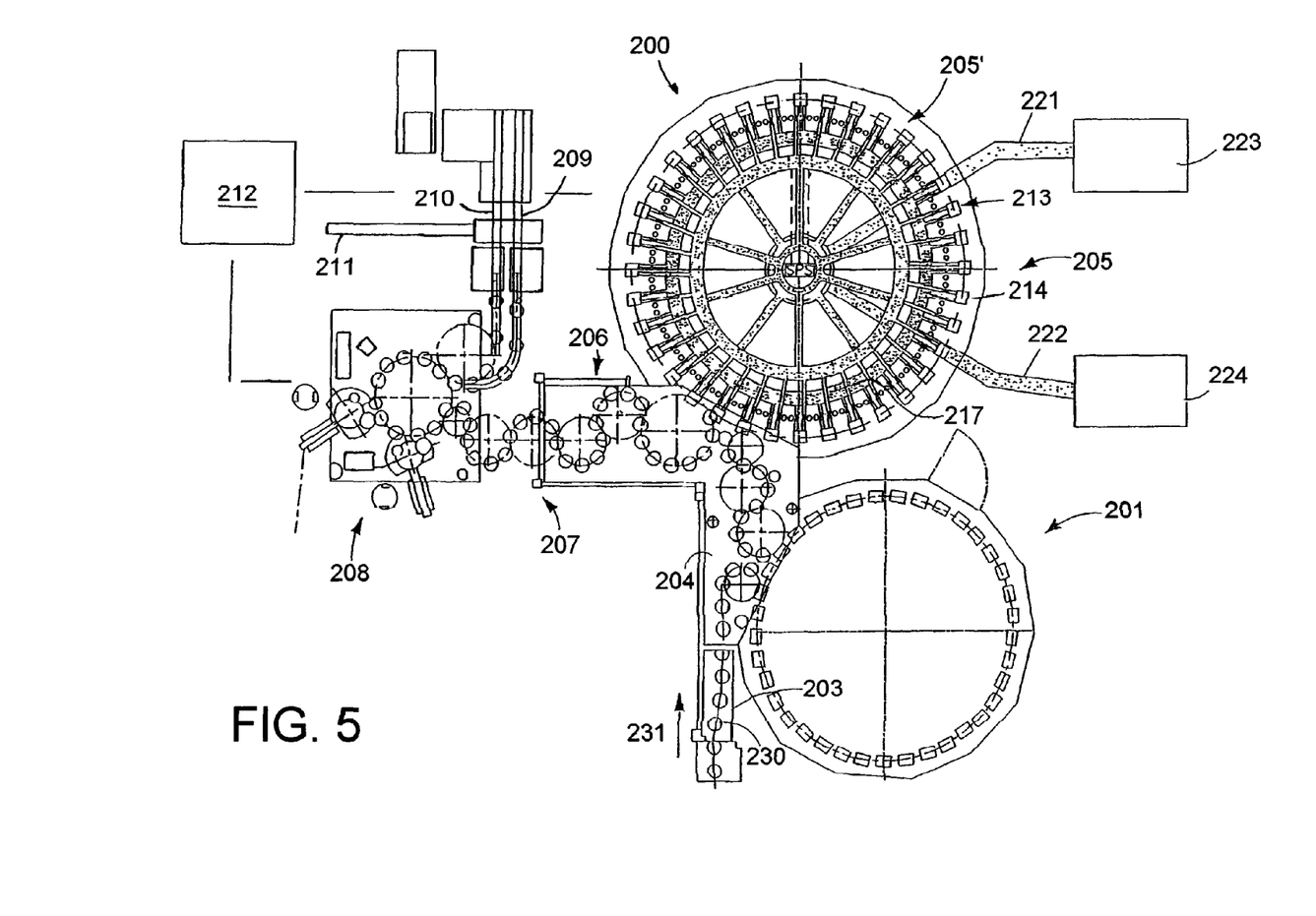
FIG. 5 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 5 shows a rinsing arrangement or rinsing station 201, to which the containers, namely bottles 230, are fed in the direction of travel as indicated by the arrow 231, by a first conveyer arrangement 203, which can be a linear conveyor or a combination of a linear conveyor and a starwheel. Downstream of the rinsing arrangement or rinsing station 201, in the direction of travel as indicated by the arrow 231, the rinsed bottles 230 are transported to a beverage filling machine 205 by a second conveyer arrangement 204 that is formed, for example, by one or more starwheels that introduce bottles 230 into the beverage filling machine 205.

The beverage filling machine 205 shown is of a revolving or rotary design, with a rotor 205', which revolves around a central, vertical machine axis. The rotor 205' is designed to receive and hold the bottles 230 for filling at a plurality of filling positions 213 located about the periphery of the rotor 205'. At each of the filling positions 203 is located a filling arrangement 214 having at least one filling device, element, apparatus, or valve. The filling arrangements 214 are designed to introduce a predetermined volume or amount of liquid beverage into the interior of the bottles 230 to a predetermined or desired level.

The filling arrangements 214 receive the liquid beverage material from a toroidal or annular vessel 217, in which a supply of liquid beverage material is stored under pressure by a gas. The toroidal vessel 217 is a component, for example, of the revolving rotor 205'. The toroidal vessel 217 can be connected by means of a rotary coupling or a coupling that permits rotation. The toroidal vessel 217 is also connected to at least one external reservoir or supply of liquid beverage material by a conduit or supply line. In the embodiment shown in FIG. 5, there are two external supply reservoirs 223 and 224, each of which is configured to store either the same liquid beverage product or different products. These reservoirs 223, 224 are connected to the toroidal or annular vessel 217 by corresponding supply lines, conduits, or arrangements 221 and 222. The external supply reservoirs 223, 224 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 214 could be connected by separate connections to each of the two toroidal vessels and have two individually-controllable fluid or control valves, so that in each bottle 230, the first product or the second product can be filled by means of an appropriate control of the filling product or fluid valves.

Downstream of the beverage filling machine 205, in the direction of travel of the bottles 230, there can be a beverage bottle closing arrangement or closing station 206 which closes or caps the bottles 230. The beverage bottle closing arrangement or closing station 206 can be connected by a third conveyer arrangement 207 to a beverage bottle labeling arrangement or labeling station 208. The third conveyor arrangement may be formed, for example, by a plurality of starwheels, or may also include a linear conveyor device.

In the illustrated embodiment, the beverage bottle labeling arrangement or labeling station 208 has at least one labeling unit, device, or module, for applying labels to bottles 230. In the embodiment shown, the labeling arrangement 208 is connected by a starwheel conveyer structure to three output conveyer arrangements: a first output conveyer arrangement 209, a second output conveyer arrangement 210, and a third output conveyer arrangement 211, all of which convey filled, closed, and labeled bottles 230 to different locations.

The first output conveyer arrangement 209, in the embodiment shown, is designed to convey bottles 230 that are filled with a first type of liquid beverage supplied by, for example, the supply reservoir 223. The second output conveyer arrangement 210, in the embodiment shown, is designed to convey bottles 230 that are filled with a second type of liquid beverage supplied by, for example, the supply reservoir 224. The third output conveyer arrangement 211, in the embodiment shown, is designed to convey incorrectly labeled bottles 230. To further explain, the labeling arrangement 208 can comprise at least one beverage bottle inspection or monitoring device that inspects or monitors the location of labels on the bottles 230 to determine if the labels have been correctly placed or aligned on the bottles 230. The third output conveyer arrangement 211 removes any bottles 230 which have been incorrectly labeled as determined by the inspecting device.

The beverage bottling plant can be controlled by a central control arrangement 212, which could be, for example, computerized control system that monitors and controls the operation of the various stations and mechanisms of the beverage bottling plant.

Naturally the present application is not restricted to the possible embodiments described above, but can incorporate a wide variety of modifications and variations without going beyond the basic teaching of the present application. In one possible embodiment, the exact or general configuration of the handling element and its movement into the area of the bottles to be removed is variable. Basically, configurations that resemble a robot arm or slide systems that can be moved in three dimensions are also conceivable.

An apparatus for the removal of containers from a container treatment machine is created which makes it possible to quickly and easily remove individual containers from the plant during operation. The present application teaches that this object is achieved by an apparatus for the removal of containers 3 from a container treatment plant, wherein a handling element 5 is provided with a suction cup 6 which is located on its end and to which a partial vacuum is applied. The handling element 5 is realized so when the partial vacuum is applied, a container 3 is held by the suction cup 6.

A handling element 5 is provided with a suction cup 6 which is located on its one end and to which a partial vacuum can be applied, whereby the handling element 5 is realized so that when the partial vacuum is applied, the suction cup picks up and holds a container 3.

One feature or aspect of an embodiment is believed at the time of the filing of this patent application to possibly reside broadly in an apparatus for the removal of containers 3 from a container treatment plant, wherein a handling element 5 is provided with a suction cup 6 which is located on its end and to which a partial vacuum is applied, which handling element 5 is realized so when the partial vacuum is applied, a container 3 is held by the suction cup 6.

Another feature or aspect of an embodiment is believed at the time of the filing of this patent application to possibly reside broadly in the apparatus, wherein the handling element 5 is located on a movable slide 7 and/or is realized so that it can be extended longitudinally.

Yet another feature or aspect of an embodiment is believed at the time of the filing of this patent application to possibly reside broadly in the apparatus, wherein the slide 7 can be moved between a pickup area and a discharge area.

Still another feature or aspect of an embodiment is believed at the time of the filing of this patent application to possibly reside broadly in the apparatus, wherein the pickup area covers the container inlet area of a container treatment plant.

A further feature or aspect of an embodiment is believed at the time of the filing of this patent application to possibly reside broadly in the apparatus, wherein the pickup area covers the parallel or substantially parallel container inlet guides 4 of a container rinsing machine.

Another feature or aspect of an embodiment is believed at the time of the filing of this patent application to possibly reside broadly in the apparatus, wherein a detection device is provided for the detection of the containers 3 to be removed.

Yet another feature or aspect of an embodiment is believed at the time of the filing of this patent application to possibly reside broadly in the apparatus, wherein the detection apparatus is realized in the form of an optical detection system and/or in the form of a camera system and/or in the form of a mechanical sensor system.

Still another feature or aspect of an embodiment is believed at the time of the filing of this patent application to possibly reside broadly in the apparatus, wherein a control apparatus is provided, which is realized so that after a detection of a container 3 to be removed, it moves the slide 7 to the container 3 to be removed, extends the handling element 5 toward the container 3, applies the partial vacuum to the suction cup 6 and thereby picks up the container 3.

A further feature or aspect of an embodiment is believed at the time of the filing of this patent application to possibly reside broadly in the apparatus, wherein the control apparatus is also realized so that it retracts the handling element 5, moves the slide 7 into the discharge area, breaks the partial vacuum and thereby releases the container 3.

Another feature or aspect of an embodiment is believed at the time of the filing of this patent application to possibly reside broadly in the apparatus, wherein the handling element 5 is connected with a tube by means of a ball and socket joint.

Yet another feature or aspect of an embodiment is believed at the time of the filing of this patent application to possibly reside broadly in the apparatus, wherein the tube is realized so that it can be extended longitudinally.

Still another feature or aspect of an embodiment is believed at the time of the filing of this patent application to possibly reside broadly in the apparatus, wherein on the tube, at least one gripper 15 and/or one control apparatus is provided for the partial vacuum to be applied to the suction cup 6.

A further feature or aspect of an embodiment is believed at the time of the filing of this patent application to possibly reside broadly in an apparatus for the removal of containers 3 from a stream of containers moved in groups or lanes of a container treatment plant, comprising a handling element 5 with a suction cup 6 which is located on its one end and to which a partial vacuum can be applied, which is realized so that when the partial vacuum is applied by the suction cup 6, a container 3 is held, and a detection apparatus is provided for the detection of the container 3 to be removed, wherein the handling element 5 is located on a movable slide 7 and/or is realized so that it can extended longitudinally, and a control apparatus is provided which is realized so that after a detection of a container 3 to be removed, which can have any random orientation; moves the slide 7 toward the container 3 to be removed, extends the handling element 5 toward the container 3, applies the partial vacuum to the suction cup 6 and the container 3 can thereby be picked up and lifted out of the stream of containers.

One feature or aspect of an embodiment is believed at the time of the filing of this patent application to possibly reside broadly in the apparatus, wherein the slide 7 can be moved between a pickup area and a discharge area.

Another feature or aspect of an embodiment is believed at the time of the filing of this patent application to possibly reside broadly in the apparatus, wherein the pickup area covers the container inlet area of a container treatment plant.

Yet another feature or aspect of an embodiment is believed at the time of the filing of this patent application to possibly reside broadly in the apparatus, wherein the pickup area covers the parallel or substantially parallel container inlet guides 4 of a container rinsing machine.

Still another feature or aspect of an embodiment is believed at the time of the filing of this patent application to possibly reside broadly in the apparatus, wherein the detection apparatus is realized in the form of an optical detection system and/or in the form of a camera system and/or in the form of a mechanical sensor system.

A further feature or aspect of an embodiment is believed at the time of the filing of this patent application to possibly reside broadly in the apparatus, wherein the control apparatus is also realized so that it retracts the handling element 5, moves the slide 7 into the discharge area, breaks the partial vacuum and thereby releases the container 3.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of suction devices for grasping bottles by a suction force and then lifting and moving the bottles that may possibly be utilized or possibly adapted for use in at least one possible embodiment of the present application may possibly be found in the following patents: International Patent Publication No. WO 97/16346, published May 9, 1997, and having inventor Faulhaber; French Patent Application No. 2794426 A1, published Dec. 8, 2000, and having inventor Bollenbach; and German Patent Publication No. DE 413-4735 A1, published Apr. 22, 1993, and having inventor Pürckhauer.

Some examples of imaging and sensor systems used to detect the position and/or status of items to be grasped or picked up and moved by a device that may possibly be utilized or possibly adapted for use in at least one possible embodiment of the present application may possibly be found in the following U.S. Pat. No. 7,269,479 issued to Okamoto et al. on Sep. 11, 2007; and U.S. Pat. No. 6,301,763 issued to Pryor on Oct. 16, 2001.

Some examples of stepping motors that may possibly be utilized or possibly adapted for use in at least one possible embodiment of the present application may possibly be found in the following U.S. Pat. No. 6,348,774 issued to Andersen et al. on Feb. 19, 2002; U.S. Pat. No. 6,373,209 issued to Gerber et al. on Apr. 16, 2002; U.S. Pat. No. 6,424,061 issued to Fukuda et al. on Jul. 23, 2002; U.S. Pat. No. 6,509,663 issued to Aoun on Jan. 21, 2003; U.S. Pat. No. 6,548,923 to Ohnishi et al. on Apr. 15, 2003; and U.S. Pat. No. 6,661,193 issued to Tsai on Dec. 9, 2003.

Some examples of servo-motors that may possibly be utilized or possibly adapted for use in at least one possible embodiment of the present application may possibly be found in the following U.S. Pat. No. 4,050,434 issued to Zbikowski et al. on Sep. 27, 1977; U.S. Pat. No. 4,365,538 issued to Andoh on Dec. 28, 1982; U.S. Pat. No. 4,550,626 issued to Brouter on Nov. 5, 1985; U.S. Pat. No. 4,760,699 issued to Jacobsen et al. on Aug. 2, 1988; U.S. Pat. No. 5,076,568 issued to de Jong et al. on Dec. 31, 1991; and U.S. Pat. No. 6,025,684 issued to Yasui on Feb. 15, 2000.

Some examples of synchronous motors which may possibly be utilized or adapted for use in at least one possible embodiment may possibly be found in the following U.S. Pat. No. 6,713,899, entitled "Linear synchronous motor;" U.S. Pat. No. 6,486,581, entitled "Interior permanent magnet synchronous motor;" U.S. Pat. No. 6,424,114, entitled "Synchronous motor;" U.S. Pat. No. 6,388,353, entitled "Elongated permanent magnet synchronous motor;" U.S. Pat. No. 6,329,728, entitled "Cylinder-type linear synchronous motor;" U.S. Pat. No. 6,025,659, entitled "Synchronous motor with movable part having permanent magnets;" U.S. Pat. No. 5,936,322, entitled "Permanent magnet type synchronous motor;" and U.S. Pat. No. 5,448,123, entitled "Electric synchronous motor."

Some examples of position sensors or position sensor systems that may be used or adapted for use in at least one possible embodiment of the present invention may be found in the following U.S. Pat. No. 5,794,355, issued to inventor Nickum on Aug. 18, 1998; U.S. Pat. No. 5,520,290, issued to inventors Kumar et al. on May 28, 1996; U.S. Pat. No. 5,074,053, issued to inventor West on Dec. 24, 1991; and U.S. Pat. No. 4,087,012, issued to inventor Fogg on May 2, 1978.

Some examples of cameras or the like optical monitoring apparatus that may possibly be utilized or possibly adapted for use in at least one possible embodiment of the present application may possibly be found in the following U.S. Pat. No. 5,233,186 issued to Ringlien on Aug. 3, 1993; U.S. Pat. No. 5,243,400 issued to Ringlien on Sep. 7, 1993; U.S. Pat. No. 5,369,713 issued to Schwartz et al. on Nov. 29, 1994; U.S. Pat. No. 5,442,446 issued to Gerber et al. on Aug. 15, 1995; U.S. Pat. No. 5,661,295 issued to Buchmann et al. on Aug. 26, 1997; and U.S. Pat. No. 5,898,169 issued to Nodbryhn on Apr. 27, 1999.

Some examples of computer systems that may possibly be utilized or possibly adapted for use in at least one possible embodiment of the present application may possibly be found in the following U.S. Pat. No. 5,416,480 issued to Roach et al. on May 16, 1995; U.S. Pat. No. 5,479,355 issued to Hyduke on Dec. 26, 1995; U.S. Pat. No. 5,481,730 issued to Brown et al. on Jan. 2, 1996; U.S. Pat. No. 5,805,094 issued to Roach et al. on Sep. 8, 1998; U.S. Pat. No. 5,881,227 issued to Atkinson et al. on Mar. 9, 1999; and U.S. Pat. No. 6,072,462 issued to Moshovich on Jun. 6, 2000.

All of the patents, patent applications or patent publications, which were cited in the German Office Action dated Jul. 16, 2008, and/or cited elsewhere are hereby incorporated by reference as if set forth in their entirety herein as follows: DE 195 49 454, having the following English translation of the German title "Wine bottle handling machine has pneumatic suction pad attached to swivel arm," published on Aug. 21, 1997; DE 21 26 198, having the following English translation of the German title "Horizontal bottle suction grab—has additional heads engaging with necks and feelers controlling vacuum supply," published on Dec. 7, 1972; DE 10 2005 014 300, having the following English translation of the German title "Bottle sorting unit recognition unit has camera and optical unit scanning bottles in boxes from bottom to top to select empty bottles," published on Sep. 28, 2006; DE 200 06 059, having the following German title "Anordnung zur Sortierung von Gefässen," published on Dec. 7, 2000; FR 2,030,980, having the following English translation of the French title "APPARATUS FOR MONITORING THE POSITION OF VESSELS ON A CONVEYOR," published on Nov. 13, 1970; DE 296 04 683 U1, having the following German title "Vorrichtung zum Aussortieren von als fehlerhaft erkannten Verpackungseinheiten," published on May 2, 1996; DE 100 07 627 C2, having the following English translation of the German title "Procedure for guiding out of bottles in lying position from stream of bottles standing upright entails using pusher which can move forwards and backwards in pulsing fashion at right angles to conveying path of bottles," published on Sep. 13, 2001; DE 199 28 734, having the following English translation of the German title "Vacuum handling facility has lifting tube attached to vacuum generator, vacuum gripper, sensor, and closure mechanism," published on Dec. 14, 2000; DE 103 38 061, having the following English translation of the German title "Pneumatic pick-up holder for industrial robot has connector for a pressure measuring instrument," published on Mar. 24, 2005; and WO 90/12675, having the title "SPECIFICATION FOR HAND-HELD PICK-UP DEVICE," published on Nov. 1, 1990.

All of the patents, patent applications or patent publications, which were cited in the International Search Report dated Feb. 10, 2009, and/or cited elsewhere are hereby incorporated by reference as if set forth in their entirety herein as follows: U.S. Pat. No. 2,677,471, having the title "Transfer apparatus," published on May 4, 1954; U.S. Pat. No. 5,467,790, having the title "Manifold and valve block assembly," published on Nov. 21, 1995; U.S. Pat. No. 5,419,050, having the title "Range adjustable laser sight for bows," published on May 30, 1995; U.S. Pat. No. 4,822,236, having the title "Apparatus for booking an elastomer article," published on Apr. 18, 1989; EP 0 017 489, having the title "Automatic apparatus for handling ceramic ware," published on Oct. 15, 1980; U.S. Pat. No. 5,219,432, having the title "Device for unstacking flat objects," published on Jun. 15, 1993; EP 1,700,643, having the following English translation of the German title "Device for feeding containers," published on Sep. 13, 2006; GB 2,193,479, having the title "Converting a multi-row stream of articles into a single row flow," published on Feb. 10, 1988; EP 0 930 136, having the title "End arm manipulator," published on Jul. 21, 1999; U.S. Pat. No. 5,135,276, having the title "Transfer boom," published on Aug. 4, 1992; EP 0 596 189, having the following English translation of the German title "Reduced-pressure gripper for supporting and clamping workpieces," published on May 11, 1994; and U.S. Pat. No. 4,767,142, having the title "Forceps for semi-conductor silicon wafer," published on Aug. 30, 1988.

The patents, patent applications, and patent publications listed above in the preceding ten paragraphs are herein incorporated by reference as if set forth in their entirety. The purpose of incorporating U.S. patents, foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2007 002 011.4, filed on Jan. 13, 2007, having inventor Klaus JENDRICHOWSKI, and DE-OS 10 2007 002 011.4 and DE-PS 10 2007 002 011.4, and International Application No. PCT/EP2007/011236, filed on Dec. 20, 2007, having WIPO Publication No. WO 2008/083825 and inventor Klaus JENDRICHOWSKI, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the corresponding foreign equivalent patent application(s), that is, PCT/EP2007/011236 and German Patent Application 10 2007 002 011.4, is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the abovementioned word in this sentence, when not used to describe technical features of one or more embodiments, are not generally considered to be incorporated by reference herein.

Statements made in the original foreign patent applications PCT/EP2007/011236 and DE 10 2007 002 011.4 from which this patent application claims priority which do not have to do with the correction of the translation in this patent application are not to be included in this patent application in the incorporation by reference.

Any statements about admissions of prior art in the original foreign patent applications PCT/EP2007/011236 and DE 10 2007 002 011.4 are not to be included in this patent application in the incorporation by reference, since the laws relating to prior art in non-U.S. Patent Offices and courts may be substantially different from the Patent Laws of the United States.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

At Least Partial Nomenclature

1 Inlet area
2 Conveyor lines
3 Bottles
4 Inlet guides

5 Handling element
6 Suction cup
7 Slide
8 Guide rail
9 Discharge container
10 Handling element
11 Suction cup
12 Tube connection
13 Ball and socket joint
14 Tube connection
15 Gripper
16 Pneumatic connection
17 Gripper

What is claimed is:

1. A removal apparatus for the removal of containers from a stream of containers, said apparatus comprising:
    a suction arrangement being mounted on a movement arrangement, and being connected to a vacuum source;
    a detection arrangement being configured to detect if a container is in an undesired orientation; and
    a control arrangement being configured, upon detection of a container in an undesired orientation, to activate said movement arrangement and thus move said suction arrangement adjacent the container to permit said suction arrangement to remove the container from a stream of containers.

2. The removal apparatus according to claim 1, wherein said movement arrangement is configured to move containers removed from a stream of containers to a discharge area.

3. The removal apparatus according to claim 1, wherein said detection arrangement comprises at least one of: an optical detection system, a camera system, and a mechanical sensor system.

4. The removal apparatus according to claim 1, wherein:
    said movement arrangement comprises a slide and a slidable element on which said handling element is mounted; and
    said control arrangement is configured to control the movement of said slidable element to essentially any position on said slide.

5. The removal apparatus according to claim 1, wherein:
    said movement arrangement comprises an elongated slide and a slidable element on which said suction arrangement is mounted;
    said elongated slide is disposed to extend transverse to the movement of containers; and
    said control arrangement is configured to control the movement of said slidable element to essentially any position on said slide to permit removal of a container adjacent essentially any position on said slide.

6. The removal apparatus according to claim 1, wherein said movement arrangement comprises a slide that is configured to be disposed to extend transversely across an inlet area adjacent a plurality of inlet guides which guide containers into individual paths of a container treatment machine or container rinsing machine.

7. The removal apparatus according to claim 1, wherein said suction arrangement comprises a movable handling element and a suction cup disposed on said handling element.

8. The removal apparatus according to claim 7, wherein:
    said handling element comprises an elongated element and said suction cup is disposed at one end thereof;
    said handling element is axially adjustable to permit movement of said suction cup away from and toward said movement arrangement.

9. The removal apparatus according to claim 7, wherein said control arrangement is configured to activate said handling element to move said suction cup and thus lift a container held by said suction cup out of a stream of containers, and is configured to break the at least partial vacuum to thereby release the container from said suction cup and into a discharge area.

10. The removal apparatus according to claim 7, wherein:
    said control arrangement is configured to activate said handling element to move said suction cup toward and into engagement with a container in an undesired orientation; and
    said control arrangement is configured to activate said vacuum source to apply at least a partial vacuum to said suction cup.

11. The removal apparatus according to claim 10, wherein:
    said handling element comprises an elongated element and said suction cup is disposed at one end thereof;
    said handling element is axially adjustable to permit movement of said suction cup away from and toward said movement arrangement.

12. The removal apparatus according to claim 11, wherein:
    said movement arrangement comprises a slide and a slidable element on which said handling element is mounted; and
    said control arrangement is configured to control the movement of said slidable element to essentially any position on said slide.

13. The removal apparatus according to claim 12, wherein said movement arrangement is configured to move containers removed from a stream of containers to a discharge area.

14. The removal apparatus according to claim 13, wherein said control arrangement is configured to activate said handling element to move said suction cup and thus lift a container held by said suction cup out of a stream of containers, and is configured to break the at least partial vacuum to thereby release the container from said suction cup and into a discharge area.

15. The removal apparatus according to claim 14, wherein said detection arrangement comprises at least one of: an optical detection system, a camera system, and a mechanical sensor system.

16. The removal apparatus according to claim 15, wherein said slide is configured to be disposed to extend transversely across an inlet area adjacent a plurality of inlet guides which guide containers into individual paths of a container treatment machine or container rinsing machine.

17. A method of removing containers from a stream of containers, said method comprising:
    detecting with a detection arrangement if a container is in an undesired orientation;
    receiving with a control arrangement an indication from said detection arrangement of detection of a container in an undesired orientation; and
    activating a movement arrangement with said control arrangement and thus moving a suction arrangement to a position adjacent the container to permit said suction arrangement to remove the container from a stream of containers.

18. The method according to claim 17, wherein said step of detecting if a container is in an undesired orientation comprises detecting if a container has fallen over from an upright position at an inlet area adjacent a plurality of inlet guides which guide containers into individual paths of a container treatment machine or container rinsing machine.

19. The method of removing containers according to claim 17, wherein said method further comprises:
    upon moving said suction arrangement to a position adjacent the container, moving a movable handling element of said suction arrangement, and thereby moving a suction cup disposed on said handling element toward and into engagement with the container;

applying an at least partial vacuum to said suction cup to thereby hold the container; and moving said handling element and said suction cup, and thereby lifting the container held by said suction cup out of a stream of containers.

20. The method of removing containers according to claim 19, wherein:

said step of moving a suction arrangement comprises moving a slidable element, on which said suction arrangement is mounted, on a slide of said movement arrangement to a position adjacent the container, and then, upon lifting of the container, moving said slidable element and said container to a discharge area; and said method further comprises breaking the at least partial vacuum to thereby release the container from said suction cup and into said discharge area.

* * * * *